: US007929593B2

(12) United States Patent
Khayrallah et al.

(10) Patent No.: US 7,929,593 B2
(45) Date of Patent: Apr. 19, 2011

(54) METHOD AND APPARATUS FOR SUCCESSIVE INTERFERENCE SUBTRACTION WITH COVARIANCE ROOT PROCESSING

(75) Inventors: Ali S. Khayrallah, Cary, NC (US); Carmela Cozzo, Cary, NC (US); Tracy L. Fulghum, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 502 days.

(21) Appl. No.: 12/103,145

(22) Filed: Apr. 15, 2008

(65) Prior Publication Data
US 2009/0257477 A1   Oct. 15, 2009

(51) Int. Cl.
*H04L 27/30* (2006.01)
(52) U.S. Cl. ........ 375/148; 375/267; 375/346; 455/501; 455/63.1
(58) Field of Classification Search ............ 375/144, 375/148, 260, 267, 284, 285, 340, 346–349; 455/501, 63.1, 67.11, 67.13, 296, 303, 226.1, 455/226.3, 226.4; 370/317, 320, 342, 441, 370/464, 465, 479
See application file for complete search history.

(56) References Cited

U.S. PATENT DOCUMENTS

| 7,738,535 | B2 * | 6/2010 | Jonsson et al. ............. 375/148 |
| 7,769,080 | B2 * | 8/2010 | Khayrallah ............... 375/148 |
| 2002/0041644 | A1 | 4/2002 | Brunel | |
| 2004/0157646 | A1 * | 8/2004 | Raleigh et al. ............ 455/562.1 |
| 2005/0195889 | A1 | 9/2005 | Grant et al. | |
| 2005/0201447 | A1 | 9/2005 | Cairns et al. | |
| 2005/0249269 | A1 * | 11/2005 | Tomasin et al. ............ 375/148 |
| 2008/0063033 | A1 | 3/2008 | Khayrallah | |

FOREIGN PATENT DOCUMENTS

| GB | 2418327 | 3/2006 |
| WO | 02/075950 | 9/2002 |
| WO | 2006/128490 | 12/2006 |
| WO | 2006/132593 A2 | 12/2006 |

OTHER PUBLICATIONS

Boariu, A. et al. "The Cholesky-Iterative Detector: A New Multiuser Detector for Synchronous CDMA Systems." IEEE Communications Letters, vol. 4, No. 3. Mar. 2000, pp. 77-79.

(Continued)

*Primary Examiner* — Dac V Ha
(74) *Attorney, Agent, or Firm* — Coats & Bennett, P.L.L.C.

(57) ABSTRACT

Methods and apparatus for processing a composite communication signal comprising two or more received signals of interest are disclosed. An interference-suppressing receiver, which may comprise a G-Rake receiver or a linear chip equalizer, utilizes a square-root covariance matrix in processing received signals, where the square-root covariance matrix represents impairment covariance or data covariance for the composite communication signal. In an exemplary method, a receiver detects symbols, corresponding to a signal of interest, from the composite communication signal, using processing weights calculated from a square-root covariance matrix and a net channel response for the signal of interest. The method further comprises calculating a reconstructed version of the signal of interest from the detected first symbols, generating an updated communication signal by subtracting the reconstructed version of the first signal of interest from the composite communication signal, and updating the square-root covariance matrix to obtain an updated square-root covariance matrix.

31 Claims, 8 Drawing Sheets

OTHER PUBLICATIONS

Bottomley, G. E. et al. "A Generalized RAKE Receiver for DS-CDMA Systems." IEEE 51st Vehicular Technology Conference Proceedings, 2000 (VTC 2000-Spring), vol. 2, May 15-18, 2000, pp. 941-945.

Bottomley, G. E. et al. "A Generalized RAKE Receiver for Interference Suppression." IEEE Journal on Selected Areas in Communications, vol. 18, No. 8, Aug. 2000, pp. 1536-1545.

Hadinejad-Mahram, H. "On the Equivalence of Linear MMSE Chip-Level Equalizer and Generalized RAKE." IEEE Communications Letters, vol. 8, No. 1, Jan. 2004, pp. 7-8.

Samardzija, D. et al. "Blind Successive Interference Cancellation for DS-CDMA Systems." IEEE Transactions on Communications, vol. 50, Issue 2, Feb. 2002, pp. 276-290.

Seeger, M. "Low Rank Updates for the Cholesky Decomposition." Jun. 18, 2007, Internet article available at: http://www.kyb.tuebingen.mpg.de/bs/people/seeger/papers/cholupdate.pdf.

Woodward, G. et al. "Adaptive Detection for DS-CDMA." Proceedings of the IEEE, vol. 86, Issue 7, Jul. 1998, pp. 1413-1434.

\* cited by examiner

METHOD AND APPARATUS FOR SUCCESSIVE INTERFERENCE SUBTRACTION WITH COVARIANCE ROOT PROCESSING

TECHNICAL FIELD

The present invention generally relates to wireless communications, and particularly relates to methods and apparatus for processing communication signals using successive interference subtraction.

BACKGROUND

Conventional wireless receivers often use noise and/or data covariance information in the form of a covariance matrix to suppress interference between multiple received signals, i.e., multiple sample sets of a single transmitted signal, multiple different signals, or any combination thereof. Examples of interference suppressing receivers include chip equalizers, RAKE receivers, Generalized RAKE (GRAKE) receivers, single-input multiple-output receivers, multiple-input multiple-output receivers, etc.

As is known in the art, multi-user detection (MUD) has been shown to be an effective way to suppress multiple-access interference (MAI) and to improve system capacity. In MUD systems, the signals from interfering users are used in the detection of individual user signals. Examples of MUD systems include interference subtraction receivers, often referred to as successive interference cancellation (SIC) receivers, and decision feedback (DF) receivers. The SIC approach is based on the idea that once a decision has been made about an interfering user's bit, then the interfering signal can be recreated at the receiver using knowledge of the channel and subtracted from the received signal. This process is repeated successively, for one or more other users' signals, and progressively reduces the interference as each of the signals associated with other users is detected. Often, the strongest signals are detected first and canceled from the received signal, which mitigates the interference for weaker signals.

The DF approach is based on a similar idea, except the subtraction is done on a processed version of the received signal, namely the receiver decision statistics. Furthermore, the subtracted quantity is formed from the previously detected user bits, in a similar manner as decision feedback equalization. While MUD systems are effective in reducing MAI, the complexity of optimal MUD systems increases exponentially with the number of users. Thus, most practical MUD systems use sub-optimal detection systems.

Interference suppressing receivers require accurate tracking of statistical properties of the received signal and/or signal impairments, typically using a covariance matrix. Tracking data or impairment covariances often requires highly complex computations due to the large number of received sample sets. These complex computations often restrict a wireless receiver's ability to accurately track and utilize the signal covariances. These problems may be exacerbated in interference subtraction receivers and other MUD receiver designs because of the need to calculate covariances each time a received signal is modified by subtracting an interfering user's signal.

SUMMARY

Disclosed herein are methods and apparatus for processing a composite communication signal comprising two or more simultaneously received signals of interest. An exemplary receiver, which may include a G-Rake receiver, a linear chip equalizer, or another interference-suppressing receiver, utilizes a square-root covariance matrix for processing received signals, where the square-root covariance matrix is an alternative to a covariance matrix for representing impairment covariance or data covariance for the composite communication signal.

In an exemplary method for processing a composite communication signal, a receiver detects first symbols, corresponding to a first signal of interest, from the composite communication signal, using processing weights calculated from a square-root covariance matrix and a net channel response for the first signal of interest. As noted above, the square-root matrix represents impairment covariance or data covariance for the composite communication signal. The method further comprises calculating a reconstructed version of the first signal of interest from the detected first symbols, generating an updated communication signal by subtracting the reconstructed version of the first signal of interest from the composite communication signal, and updating the square-root covariance matrix to obtain an updated square-root covariance matrix. In some embodiments, updating the square-root covariance matrix comprises applying one or more rank-one updates to the square-root covariance matrix, although higher-rank updates may also be used. In some embodiments, a single rank-one update, calculated as a function of the net channel response for the first signal of interest, is used, while in others a more extensive updating process, based on a model of the data covariance of the reconstructed version of the first signal of interest, is employed.

An updated square-root covariance matrix produced according to the invention by a first receiver stage may be provided to a second receiver stage for processing the updated communication signal. In such an embodiment, second symbols, corresponding to a second signal of interest, may be detected, using second processing weights calculated from the updated square-root covariance matrix and a net channel response for the second signal of interest. In some embodiments, the second signal of interest may be reconstructed and subtracted from the updated communication signal to produce a second updated communication signal for further processing.

Apparatus for processing a composite communication signal according to one or more of the above methods, as well as variations of those methods, are also disclosed herein. In particular, receiver circuits configured for receiving and processing a composite communication signal comprising two or more signals of interest are disclosed. In some embodiments, a receiver circuit comprises a signal detection circuit configured to detect first symbols, corresponding to a first signal of interest, from the composite communication signal, using processing weights calculated from a square-root covariance matrix and a net channel response for the first signal of interest. In these embodiments, the receiver circuit may further comprise an interference cancellation circuit configured to calculate a reconstructed version of the first signal of interest, based on the detected first symbols, and to generate an updated communication signal by subtracting the reconstructed version of the first signal of interest from the composite communication signal. The receiver circuit further comprises a covariance update circuit configured to update the square-root covariance matrix to obtain an updated square-root covariance matrix corresponding to the updated communication signal. The signal detection circuit may comprise a Rake or G-Rake receiver, in which case the processing weights may comprise Rake or G-Rake combining weights.

In other embodiments, the signal detection circuit may comprise a chip equalizer, in which case the processing weights may comprise chip equalizer tap weights. In some embodiments, the receiver circuit may comprise one or more additional receiver stages, including one or more additional signal detection circuits, for further processing of the updated communication signal using the updated square-root covariance matrix.

Of course, the present invention is not limited to the above features and advantages. Those skilled in the art will recognize additional features and advantages upon reading the following detailed description, and upon viewing the accompanying drawings.

DETAILED DESCRIPTION

Discussing and illustrating details in the many exemplary embodiments of the present invention necessarily involves a certain level of complexity. Such complexities are explored in the exemplary details given later herein but an initial understanding of the present invention's broader aspects may be gained with reference to the relatively simple diagram given in FIG. 1. However, before discussing FIG. 1, it should be understood that the present invention broadly involves the application of G-Rake-based signal detection (or other processing techniques that utilize data and/or impairment covariance matrices in the signal detection process) in combination with successive interference cancellation.

As used herein the term "G-Rake" connotes a Rake combining circuit and/or combining method that calculates combining weights based on an estimate of impairment correlations between the Rake correlator outputs ("fingers"). Such impairments arise, for example, because of MAI, spreading code reuse, channel fading and multipath conditions, inter-cell interference, etc. As will be explained in more detail below, G-Rake processing may be adapted for use in a successive interference cancellation receiver so that impairment correlation processing in the successive stages of an exemplary signal detection chain reflect changing impairment conditions arising from successive signal cancellations.

Figure 1:
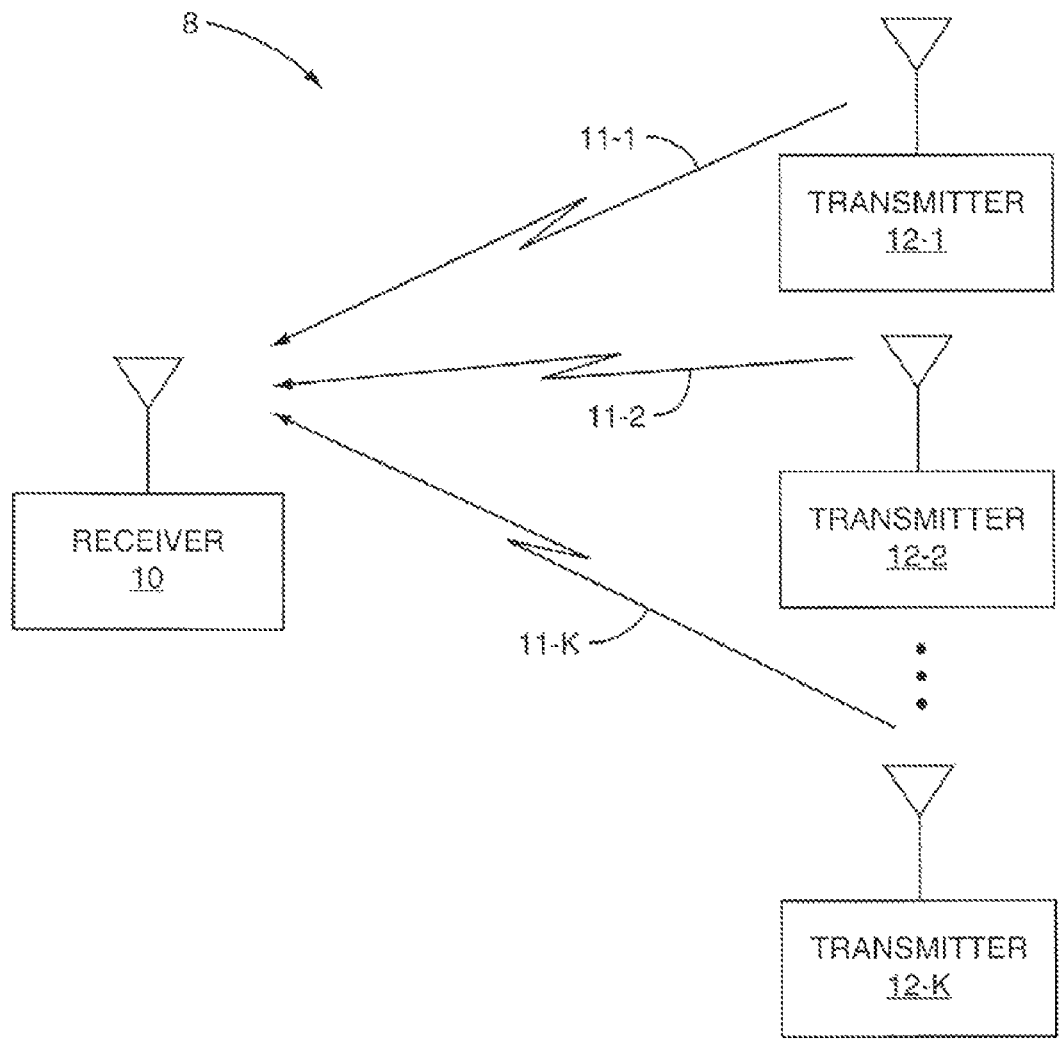
FIG. 1 illustrates an exemplary communication system.

FIG. 1 illustrates an exemplary wireless communication system 8 comprising a receiver 10 and several transmitters 12-1 to 12-K communicating over respective propagation channels 11-1 to 11-K. For purposes of processing the received signals, the channels may be considered to include the effects of the transmit and receive signal processing paths (e.g., filter pulse shapes), as well as the effects of the transmission medium (e.g., the propagation paths between the transmitter and receiver). The receiver 10 may, for example, be included in or associated with a radio base station, while each of the transmitters 12-1 to 12-K may be included in or associated with a mobile terminal, such as a cellular radiotelephone, a Portable Digital Assistant (PDA), laptop/palmtop computer, or other device having wireless communication capability.

The receiver 10 and transmitters 12 operate, for example, according to an agreed upon wireless signaling format/protocol, such as according to IS-95B/IS-2000 (CDMA 2000) Code Division Multiple Access (CDMA), Wideband CDMA (WCDMA) or Universal Mobile Telecommunications Systems (UMTS) standards. Thus, while the invention is described at various points in the below discussion in the context of WCDMA systems, it will be readily apparent to those skilled in the art that the invention may be employed in other circumstances using other standards.

Furthermore, while the interference subtraction scenario is described here in an uplink setting (i.e., with regards to multiple signals received at a base station from a number of mobile transmitters), those skilled in the art will appreciate that the techniques disclosed herein may be applied to downlink signals as well. For instance, a base station transmitter 10 may be configured according to a BLAST configuration (e.g., CR-BLAST), thus using multiple antennas to transmit a user's desired signal as simultaneous parallel substreams. With this approach, the information signal for a given user is split into the parallel substreams, each of which may be separately coded. At a user's receiver, the substreams are received, typically using multiple receiver antennas, and may be detected successively as a signal of interest in a series of signal detection stages. Thus, the influence of each substream can be successively cancelled as the signal processing progresses through a chain of signal detection stages. Those skilled in the art will appreciate that selected aspects of the exemplary receiver structures described herein may thus be configured to exploit the particular characteristics of a given transmitter structure and/or signal structure.

Another application for the inventive techniques described herein, which may be useful in both downlink and uplink applications, is the mitigation of co-channel interference. In the downlink case, multiple cells transmit over the same carrier frequency, and the terminal receiver can suppress interfering signals from other cells using the disclosed methods and receiver structures. In the uplink case, a base station receiver can suppress interfering signals sent from terminals attached to other cells, again using the disclosed techniques.

Referring once more to FIG. 1, receiver 10 serves a number of users, corresponding to transmitters 12-1 to 12-K. The transmitted user signals interfere with one another at the receiver 10. Because the base station must demodulate the signals corresponding to each of the K users in any event, the additional effort required to use the output from one signal detection process in another is reasonable. Thus, it is attractive to use an interference subtraction architecture in receiver 10, so that a detected user signal may be subtracted from the composite received signal to reduce its detrimental effect on the undetected signals for other users.

Those skilled in the art will appreciate that the order of subtraction may make a difference. One possible strategy is to rank the users in order of decreasing received power, which typically translates into decreasing data rate (in bits per second). Further, the users may be grouped in subsets of similar received power. Another possible strategy is to group users according to power sub-ranges, which may be preset or adapted to the available total signal range. Any of these approaches is well suited for a mixed scenario, where high-rate data users co-exist with low-rate voice and SMS users. Another possible strategy is to rank users in order of decreasing excess signal quality. In other words, a user signal received under conditions such that the channel quality (e.g., signal-to-interference-plus-noise ration, or SINR) exceeds minimum requirements will likely be processed successfully. Hence detecting this user signal first and subtracting its interference contribution from the composite received signal is more likely to help others. Again, the above variants may be adopted. Yet another possible strategy is to rank users in decreasing order of sensitivity to processing delay. That is, some users may be sending voice data, with high sensitivity, whereas other users may be uploading a large file, with low sensitivities to processing delays. Other strategies, such as a mix of the previous three, may be considered as well. In the following discussion, it is assumed that the users have been ranked according to a suitable strategy, and are denoted 1 to K as before. First, a purely serial configuration is described, where the K users are processed sequentially. Later, a serial/parallel hybrid configuration is discussed.

In the detailed discussion that follows, the receiver for each individual signal is a G-Rake, which may be described generally as a linear whitening symbol equalizer. As is well known to those skilled in the art, it is closely related to the class of linear chip equalizers. Those skilled in the art will thus appreciate that the techniques disclosed herein in the context of a G-Rake receiver may be applied to corresponding chip equalizer structures. Furthermore, nonlinear receivers that exploit covariance information may be used instead of linear receivers. Examples include the DFE and the MLSE.

A G-Rake receiver processes de-spreader outputs obtained at different delays. The details of the conventional G-Rake receiver are now well known, having been described extensively in technical literature (see, e.g., G. E. Bottomley, T. Ottosson, and Y.-P. E. Wang, "A generalized RAKE receiver for interference suppression," IEEE J. Select. Areas Commun., vol. 18, pp. 1536-1545, August 2000), as well as in patent applications (see, e.g., Cairns et al., U.S. patent application Ser. No. 10/800,167, filed Mar. 12, 2004 and published as U.S. Patent Application Publication 2005/0201447 A1, the entire contents of which are incorporated herein by reference). Those details are thus not repeated here.

Figure 2:
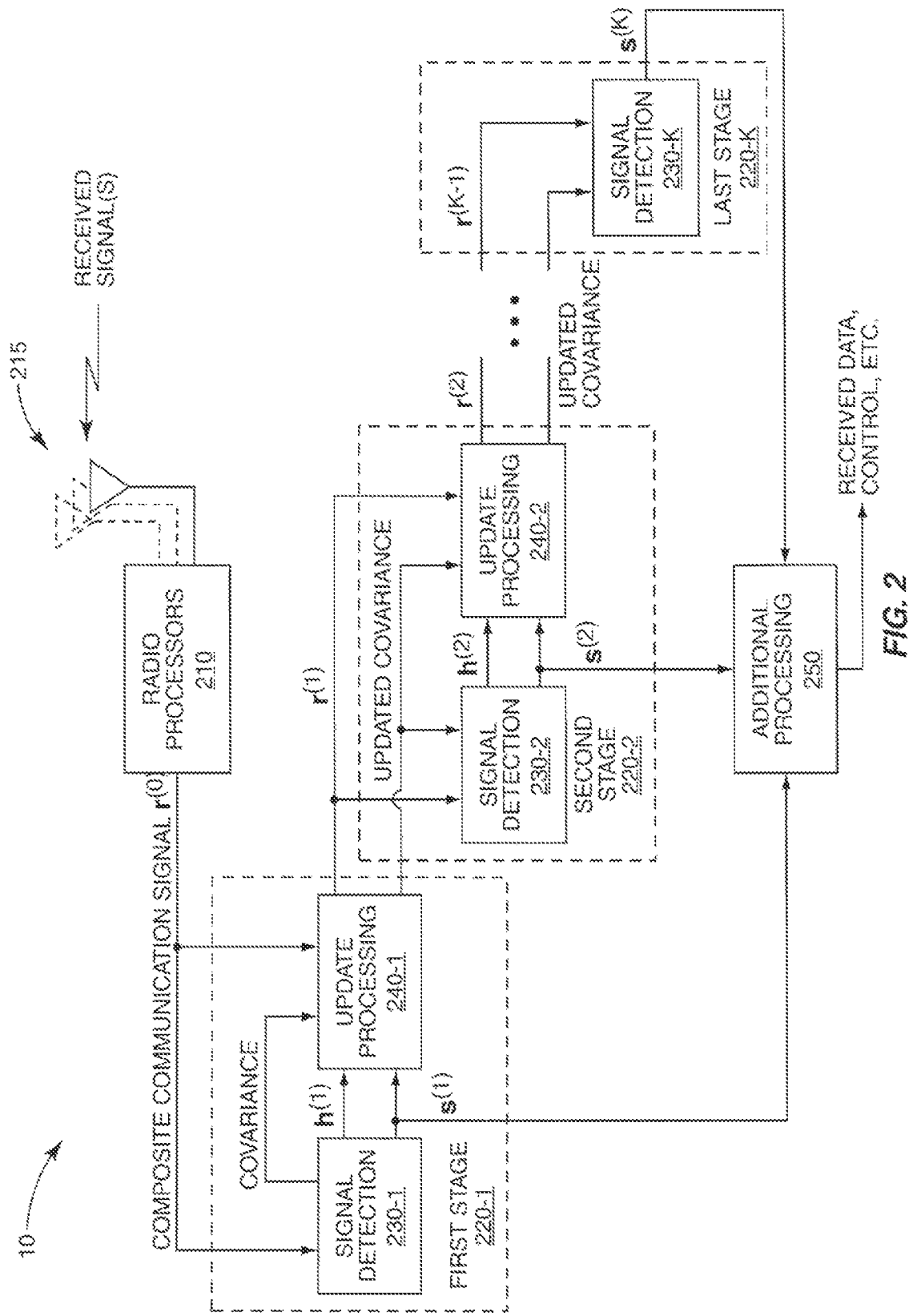
FIG. 2 is a block diagram illustrating an exemplary interference subtraction receiver according to one embodiment of the invention.

FIG. 2 provides a block diagram for an exemplary interference subtraction receiver 10 according to one or more embodiments of the invention. Receiver 10 includes a radio front-end, comprising a number of receiver antennas 215 and one or more radio processors 210. The radio processors 210 may include amplifiers, filters, mixers, digitizers, and/or other electronics as needed to produce the sampled composite communication signal for further processing. Receiver 10 further comprises a plurality of successive receiver stages 220-1 through 220-K. In an exemplary configuration each stage (except for the last, as will be discussed below) comprises a signal detection circuit 230 and an update processing circuit 240.

In operation, the radio processor(s) 210 are configured to provide digitized samples corresponding to a received composite signal, $r^{(0)}$, which includes multiple signals of interest.

These multiple signals of interest may represent different user signals transmitted from two or more transmitters 10. In any case, the successive receiver stages 220-1 to 220-K are configured to provide successive detection of the signals of interest within the received composite signal, e.g., signals $S_1$, $S_2, \ldots, S_K$, and further configured to provide successive cancellation of the detected signals such that later stages in the detection chain benefit from the detection and cancellation of signals in the prior stages. Thus, interference arising from the detected signal of interest in each receiver stage 220-$i$ is removed successively from the cascaded stage input signals based on detecting a signal of interest in each stage 220 and updating the composite communication signal by subtracting the detected signal of interest from the stage input signal provided to the next stage 18.

For example, in the illustrated configuration, stage 220-1 detects signal of interest $S_1$ from its stage input signal using its signal detection circuit 230-1, which provides output symbols $s^{(1)}$ (indexed with "1" to indicate stage "1"). Signal detection circuit 230-1 also provides an estimate of the net channel response vector $h^{(1)}$ corresponding to signal $S_1$. Signal $S_1$ is reconstructed by update circuit 240-1, using the detected symbols $s^{(1)}$ and the net channel response vector $h^{(1)}$, and subtracted from the composite communication signal $r^{(0)}$, to obtain an updated communication signal $r^{(1)}$. The updated communication signal $r^{(1)}$ thus still includes the remaining undetected signals of interest $S_2, S_3, \ldots, S_K$, but the interference to those other signals that might otherwise have been caused by signal $S_1$ is no longer present, or is at least significantly reduced.

The updated communication signal $r^{(1)}$ is provided to stage 220-2, which detects signal $S_2$ and removes it to produce another updated signal $r^{(2)}$, which includes the remaining undetected signals of interest $S_3, \ldots, S_K$. This process may be repeated until the last updated communication signal ($r^{(K-1)}$) is processed by the last stage 220-K to obtain the last undetected signal of interest, signal $S_K$. Thus, the stage input signal to stage 220-$n$ benefits from the subtraction of all prior detected signals, such that the interference caused by the mutually received signals of interest is successively lessened as processing progresses through the series of stages 220.

Each signal detection circuit 230 may comprise a G-Rake receiver. Without loss of generality, consider signal detection circuit 230-1, which detects symbols $s^{(1)}$, corresponding to the received signal of interest $S_1$. The received chip samples before de-spreading are denoted $r^{(0)}$, and a data covariance matrix corresponding to $r^{(0)}$ is denoted $R_d^{(0)}$. The signal detection circuit 230-1 includes de-spreading and G-Rake combining operations, as well as channel estimation, which produces a vector of estimates $h^{(1)}$ corresponding to the net channel response for signal $S_1$. Signal detection circuit 230-1 may also include a decoder, although those skilled in the art will appreciate that either soft symbols or decoded symbols may be used in reconstructing the signal of interest for subtraction from the composite communication signal.

For simplicity, the following discussion generally assumes that each receiver stage 220 uses the same set of delays. One approach is to consider a set of delays that is equal to the union of the delays for the individual signals. Alternatively, a regular grid of delays may be used that covers the span of the delays for the individual signals. Presented further below are refinements describing how the set of delays may be pruned or augmented to suit each individual receiver.

Also for simplicity, the following analysis generally assumes that signals from different users arrive in a synchronized manner at the base station. In other words, their slots are aligned. In reality, many systems do not impose such a requirement, so that simultaneously received signals, while overlapping, are essentially un-synchronized. Again, further analysis below will demonstrate that this presents no serious problems for receivers implemented according to the present invention.

In any event, the symbols detected in receiver stage 220-1 may be used along with the spreading sequence and the channel estimates to update the received signal. Specifically, a reconstructed version of signal $S_1$ is subtracted from the composite communication signal $r^{(0)}$:

$$r^{(1)} = r^{(0)} - h^{(1)} * s_c^{(1)}, \qquad (1)$$

where $s_c^{(1)}$ is the re-spread version of the symbols $s^{(1)}$, and * indicates convolution.

The effect of signal $S_1$ can be removed from the data covariance matrix $R_d^{(0)}$ by subtracting a correction term $\Delta$ from $R_d^{(0)}$. The exact expression of $\Delta$ is the data covariance of the reconstructed signal $h^{(1)} * s_c^{(1)}$, which is given in H. Hadinejad-Mahram, "On the equivalence of linear MMSE chip equalizer and generalized RAKE," IEEE Commun. Letters, vol. 8, no. 1, January 2004. However, this is a rather complicated function of the channel $h^{(1)}$, the channel taps, the receiver fingers, and the pulse shape. Also, in general, the data covariance matrix for the reconstructed signal has full rank, or close to it, making calculations more complex. Thus, various simplifying approximations may be used instead.

In some embodiments of the invention, $\Delta$ may approximated using a correction term $\Delta_1$ calculated as the outer product of $h^{(1)}$, that is:

$$\Delta_1 = \alpha^{(1)} h^{(1)} h^{(1)H} \qquad (2)$$

Here the scaling parameter $\alpha^{(1)}$ absorbs required adjustments, if any, such as accounting for the expected value of the modulation symbols, or the relative powers of control and data symbols. Using this approximation for the data covariance of the reconstructed signal $S_1$, then the updated data covariance matrix $R_d^{(1)}$, corresponding to the updated communication signal $r^{(1)}$ becomes:

$$R_d^{(1)} = R_d^{(0)} - \alpha^{(1)} h^{(1)} h^{(1)H} \qquad (3)$$

In other embodiments a different correction term $\Delta_2$ may be used. $\Delta_2$ is similar to $\Delta_1$, but with additional diagonal terms. That is:

$$\Delta_2 = \alpha^{(1)} h^{(1)} h^{(1)H} + \gamma^{(1)} D \qquad (4)$$

Here D, is a diagonal matrix whose k-th element $d_k^{(1)}$ is equal to:

$$d_k^{(1)} = h^{(1)H} h^{(1)} - |h_k^{(1)}|^2. \qquad (5)$$

Also, $\gamma^{(1)}$ absorbs required adjustments, such as the total received energy per chip period for signal $S_1$ and the relative power of the control and data symbols.

In considering the difference between the first correction, $\Delta_1$, in Equation (2), and the second correction, $\Delta_2$, in Equation (4), those skilled in the art will appreciate that the diagonal elements of Equation (5) are nonnegative. Thus, the correction term $\Delta_2$ is more diagonally dominant than $\Delta_1$; thus, a data covariance matrix $R_d^{(1)}$ corrected with $\Delta_2$ represents a more colored process than if corrected with $\Delta_1$. This means that a G-Rake that uses $\Delta_2$ would perform more aggressive suppression than a G-Rake based on $\Delta_1$.

More generally, approximations for $\Delta$ may include additional terms beyond those above. As will be seen below, these additional terms are most readily employed in embodiments of the present invention if they can be expressed as rank-one updates. For instance, consider a vector with two non-zero elements at locations $k_1$ and $k_2$. Its outer product has nonzero diagonal elements at locations $k_1$, $k_1$ and $k_2$, $k_2$, as well as 2 non-zero off-diagonal elements at locations $k_1, k_2$ and $k_2, k_1$. This particular form is useful in the case of 2 receive antennas with dominant channel taps.

Operating in the same manner as above, more terms may be added to get closer to the exact expression for $\Delta$. However, it should be noted that the impact of a mismatched approximate correction term is relatively benign. In general, the inaccuracy can be viewed as a missed opportunity, since the approximation simply means that the updated covariance matrix $R_d^{(1)}$ includes some residual interference associated with the detected signal, even though the actual interference has been subtracted from the received signal. This means that a G-Rake receiver that uses $R_d^{(1)}$ to compute its combining weights would be effectively allocating some of its interference suppression capability to an interferer that is absent.

In the discussion immediately following, it is assumed that the update to the data covariance is given by the channel vector outer product $\Delta_1$. Later, the use of $\Delta_2$ or other approximations is reviewed.

Equation (1) above describes the subtraction of a reconstructed version of a first detected signal, $S_1$, from the composite signal, while Equation (3) shows a corresponding rank-one update to the covariance matrix. These expressions may be generalized to cover later stages of the receiver. Thus, the update processing circuit 240-i adjusts, or "updates", the received signal to become:

$$r^{(i)} = r^{(i-1)} - h^{(i)} * s_c^{(i)} \qquad (6)$$

where $h^{(i)}$ represents the net channel response for the i-th signal of interest, $s_c^{(i)}$ represents the re-spread version of the i-th signal of interest, reconstructed from the detected symbols $s^{(i)}$, and $r^{(i-1)}$ is the composite communication signal received from the previous stage, if any, or the received signal, if i=1.

The update processing circuit 240-i also adjusts the covariance matrix. It may do so using a rank-one update, according to:

$$R_d^{(i)} = R_d^{(i-1)} - \alpha^{(i)} h^{(i)} h^{(i)H} \qquad (7)$$

Figure 3:
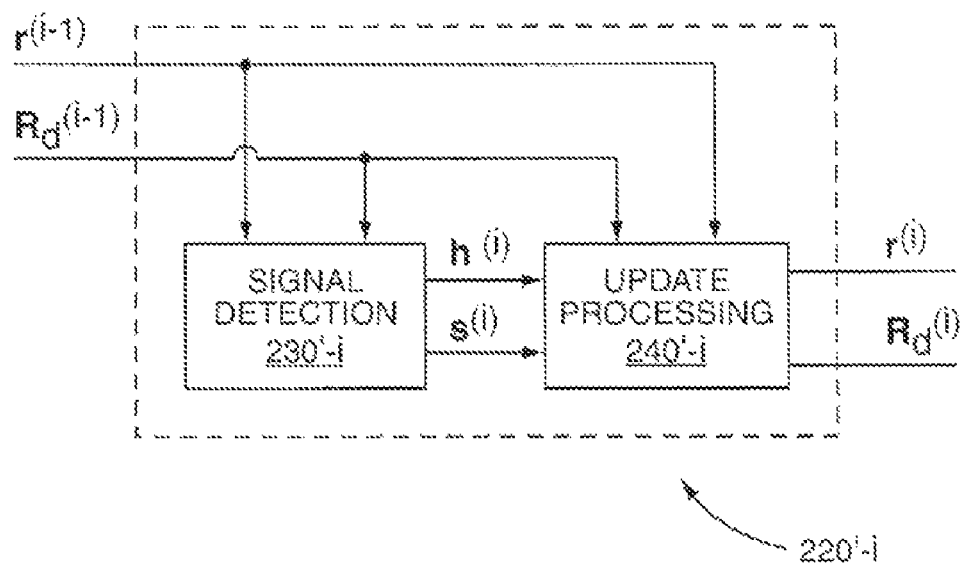
FIG. 3 illustrates an exemplary receiver stage using a covariance matrix.

One embodiment of a receiver stage is illustrated in FIG. 3. This configuration permits several such modules to be connected together in series, as was shown in FIG. 2. In the embodiment of FIG. 3, the covariance data is passed between stages in the form of the covariance matrix; thus receiver stage 220'-i receives $R_d^{(i-1)}$ from the previous stage and provides an updated covariance matrix $R_d^{(i)}$ to the next stage. Those skilled in the art will appreciate that the last stage in a series of receiver stages 220 need not include an update function. However, if it did, the resulting matrix $R_d^{(K)}$ would reflect the residual color in the signal (from which all the signals of interest have been removed), including interference from other cells, adjacent carriers, etc.

In U.S. Patent Application Publication 2008/0063033 A1 (application Ser. No. 11/470,676, filed Sep. 7, 2006, by A. Khayrallah), the entire contents of which are incorporated herein by reference, G-Rake operations using a square-root covariance matrix M, rather than the covariance matrix $R_d$, are described. This matrix M can be interpreted as the "square root" of $R_d$, and comprises a lower triangular matrix with real positive elements on the diagonal. The matrix M can be formed from $R_d$ using the Cholesky decomposition, so that:

$$R_d = MM^H. \qquad (8)$$

When applying M in G-Rake operations, it may be convenient to compute the related matrices L and D, so that:

$$R_d = LDL^H, \qquad (9)$$

where L is a lower triangular matrix with 1's on the diagonal, and D is a diagonal matrix with positive elements $d_i$. The relationship among M, L and D is given by $$M = LD^{1/2}. \qquad (10)$$

Thus, those skilled in the art will appreciate that knowledge of M implies knowledge of L and D, and vice-versa.

The decomposition procedure to produce M from $R_d$ requires about half the complexity of Gaussian elimination. Later it will be shown that this procedure may sometimes be avoided altogether by using a series of simpler updates instead.

The root matrix M may be easily updated to reflect corresponding updates to the covariance matrix $R_d$. For instance, if a new matrix R' is given by a rank-one update of R, i.e.:

$$R' = R + \alpha ee^H, \qquad (11)$$

then the square root M' of R' can be computed as an update to M, without going back to R.

To see this, let (L',D') be the corresponding pair to M'. Then L' can be computed as an update to L:

$$L' = LK, \qquad (12)$$

where K is a triangular matrix with a special structure:

$$K = \begin{bmatrix} 1 & & & & \\ p_2\beta_1^* & 1 & & & \\ p_3\beta_1^* & p_3\beta_2^* & 1 & & \\ \vdots & \vdots & \vdots & \ddots & \\ p_n\beta_1^* & p_n\beta_2^* & \cdots & p_n\beta_{n-1}^* & 1 \end{bmatrix}. \qquad (13)$$

Finally, the square root M' of R' is given by $$M' = LKD'^{1/2}. \qquad (14)$$

The parameters $p_i$ are defined by the vector $$p = L^{-1}e. \qquad (15)$$

Given p, the diagonal elements $d'_i$ of D' and the parameters $\beta_i$ may be computed using the following algorithm:

$$
\begin{aligned}
& t_1 = 1/\alpha \\
& \text{for} \quad i = 1 : n-1 \\
& \qquad a = t_i d_i + |p_i|^2 \\
& \qquad t_{i+1} = a/d_i \\
& \qquad d'_i = a/t_i \\
& \qquad \beta_i = p_i/a \\
& \text{end} \\
& d'_n = d_n + |p_n|^2/t_n
\end{aligned}
\qquad (16)
$$

Those skilled in the art will appreciate that there are alternative approaches for computing these parameters.

The rank-one root update procedure described above may be summarized as a function RU(•), with inputs M, e and $\alpha$, and output M':

$$M' = RU(M, e, \alpha) \qquad (17)$$

Several key G-Rake operations, with corresponding calculations employing the covariance matrix $R_d$ and the root matrix M are summarized in Table 1:

TABLE 1

| G-Rake Operation | Using covariance matrix | Using square-root matrix | Comment |
|---|---|---|---|
| Update | $R' = R + \alpha ee^H$ | $M' = RU(M, e, \alpha)$ | |
| Weight solution | $Rw = h$ | $Mv = h,$ $M^H w = v$ | exact solution with back-substitution |
| Combining | $z = w^H y$ | $z = w^H y$ or $z = v^H M^{-1} y$ | alternative if $M^{-1}$ available |
| SNR | $\gamma = w^H h$ | $\gamma = v^H v$ | |

Those skilled in the art will appreciate that a key advantage of the root matrix is the ability to use back substitution in the solution of linear systems. The inverse of the root matrix can be found by back substitution as well. In particular, those skilled in the art will note that, with the covariance method, the solution of $Rw = h$ is typically found using an iterative method such as Gauss-Seidel. For relatively large matrices, many iterations may be needed to get a reasonably accurate solution. In contrast, with the root method, the solution to $Mv = h$ and $M^H w = v$ is carried by back substitution, and is exact to within the precision of the computing process.

Figure 4:
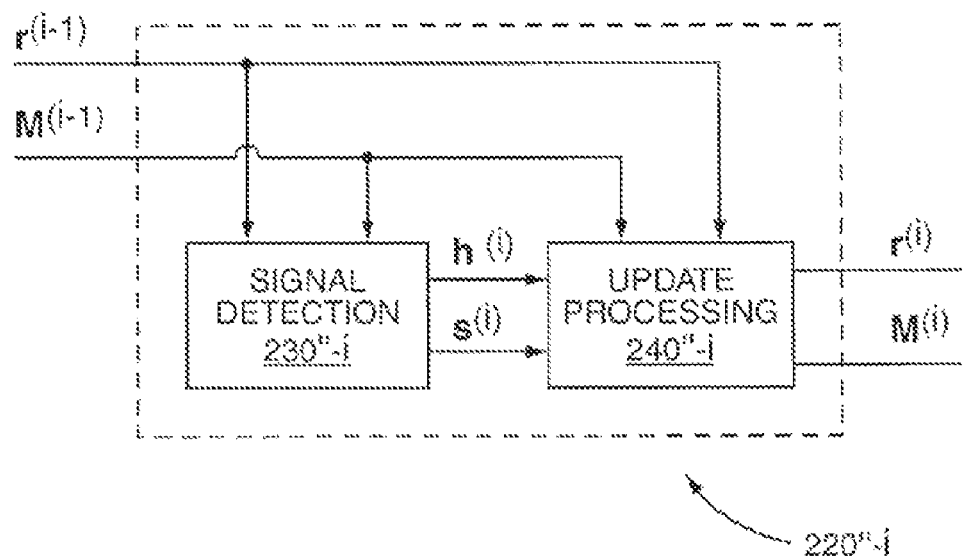
FIG. 4 illustrates an exemplary receiver stage using a square-root covariance matrix.

Using the root matrix in G-Rake receivers may thus reduce the complexity of G-Rake processing as well as of the covariance update. Thus, an alternative to the receiver stage 220' pictured in FIG. 3 is illustrated in FIG. 4. As with the configuration of FIG. 3, the receiver stage 220" of FIG. 4 permits several such modules to be connected together in series. However, in this embodiment, covariance data is passed between stages in the form of the square-root covariance matrix; thus receiver stage 220"-$i$ receives $M^{(i-1)}$ from the previous stage and provides an updated covariance matrix $M^{(i)}$ to the next stage. Again, those skilled in the art will appreciate that the last stage in a series of receiver stages 220 need not include an update function. Furthermore, because it does not receive covariance data from a prior stage, the first stage may be configured to determine an initial estimate of the covariance matrix $R_d^{(0)}$, using conventional means, and to form the corresponding root matrix $M^{(0)}$ as described above.

An interference subtraction receiver utilizing the receiver stage 220" of FIG. 4 may thus operate in the root domain instead of the covariance domain in the serial interference subtraction architecture. A square-root covariance matrix may be used by each stage to perform G-Rake processing, using the operations listed in Table 1. The square-root covariance matrix may be updated directly by each stage to account for the subtraction of a detected signal.

For example, the matrix $M^{(0)}$, which is the square-root of the covariance matrix $R_d^{(0)}$, representing the covariance of the originally received composite communication signal, may be updated to $M^{(1)}$, using the function RU(•), so that it corresponds to the updated communication signal with $S_1$ removed:

$$M^{(1)} = RU(M^{(0)}, h^{(1)}, -\alpha^{(1)}). \qquad (18)$$

This may be generalized, for receiver stage 220"-$i$:

$$M^{(i)} = RU(M^{(i-1)}, h^{(i)}, -\alpha^{(i)}) \qquad (19)$$

Thus, the covariance update may be replaced by the root matrix update.

Figure 5:
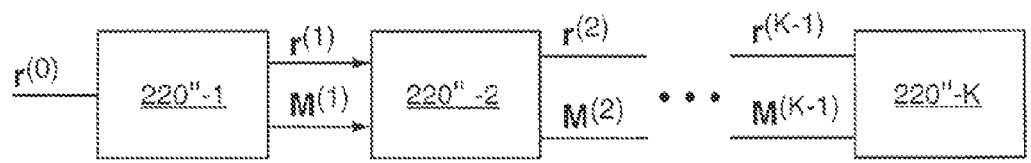
FIG. 5 is a block diagram illustrating several receiver stages connected in series.

A serial interference subtraction configuration, using the receiver stage 220" of FIG. 4, is illustrated in FIG. 5. Again, the root matrix is processed throughout. As previously discussed, the last stage 220"-K need not include the update function. Further, the first stage 220"-1 is configured to estimate the covariance for the initial input signal $r^{(0)}$.

Figure 6:
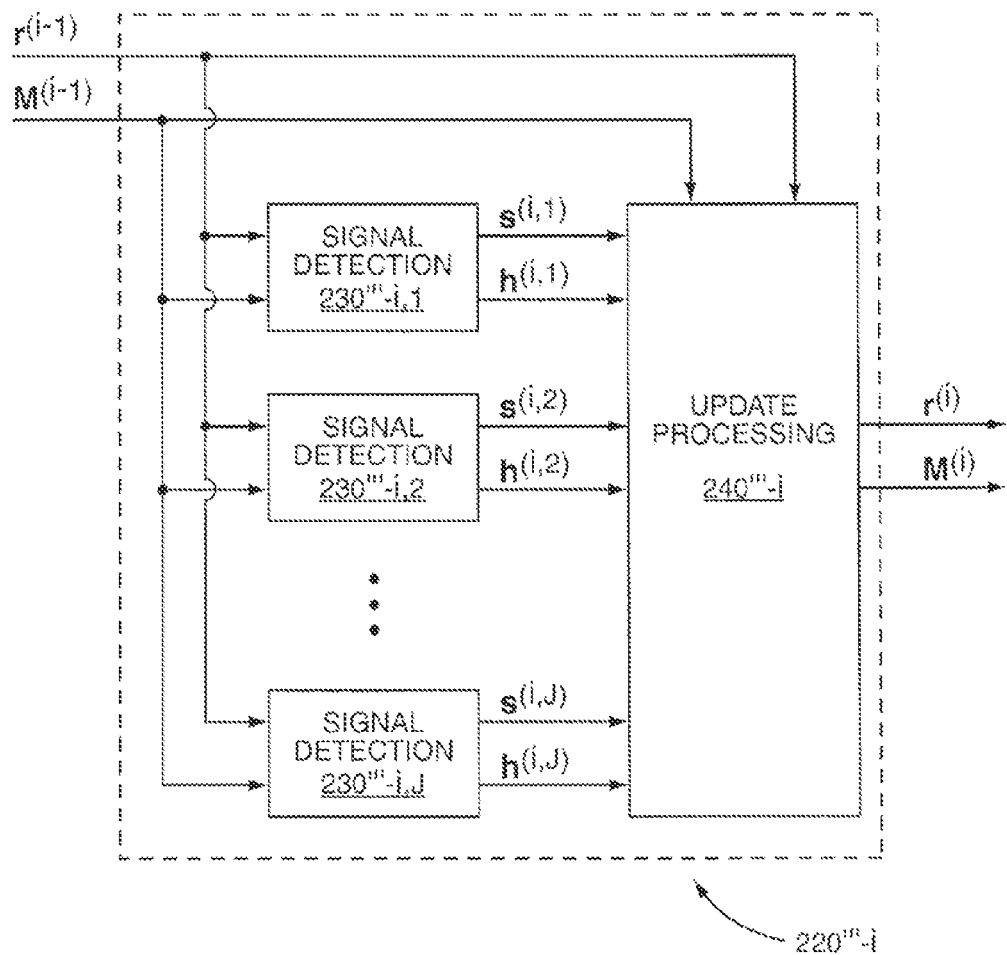
FIG. 6 is a block diagram illustrating an exemplary receiver stage configured for parallel detection of several signals.

The configuration of FIG. 5 processes a single signal at each stage. Typically, the benefit of interference subtraction is greatest when the signal being subtracted has a higher rate than subsequent signals. For signals with the same rate, the benefit of subtracting one gives only a small boost to the other. Thus, it may be beneficial in some circumstances to employ a hybrid configuration, where one or more stages process a group of users. Such an embodiment is shown in FIG. 6. Receiver stage 220'''-$i$ processes J users, labeled i,1 ... i,J. Each signal detection circuit 230''' uses the same signal $r^{(i-1)}$ and the same root matrix $M^{(i-1)}$. The signal detection circuits 230''' operate in parallel, and, in this configuration, do not help one another. Each signal detection circuit 230''' feeds its outputs to the update processing circuit 240''', which is modified to handle the J signals. In particular, the received signal is updated as follows:

$$r^{(i)} = r^{(i-1)} - h^{(i,1)} * s_c^{(i,1)} - \ldots - h^{(i,J)} * s_c^{(i,J)}. \quad (20)$$

Those skilled in the art will appreciate that adjusting the covariance matrix to account for the subtraction of the J signals would require J rank 1 updates:

$$R_d^{(i)} = R_d^{(i-1)} - \alpha^{(i,1)} h^{(i,1)} h^{(i,1)H} - \ldots - \alpha^{(i,J)} h^{(i,J)} h^{(i,J)H}. \quad (21)$$

The update to the corresponding root matrix simply requires J consecutive root matrix updates. This can be achieved as follows.

$$N^{(0)} = M^{(i-1)} \quad (22)$$
$$N^{(1)} = RU(N^{(0)}, h^{(i,1)}, -\alpha^{(i,1)})$$
$$\vdots$$
$$N^{(J)} = RU(N^{(J-1)}, h^{(i,J)}, -\alpha^{(i,J)})$$
$$M^{(i)} = N^{(K)}.$$

One special case of the serial/parallel hybrid configuration is of particular interest in practice. In some circumstances, a mixed-use scenario will have very few high-rate users and many low-rate users. Thus the high-rate users can be processed first (in series, parallel or hybrid), followed by processing of the low rate-users in parallel.

In much of the preceding discussion, the update of the square-root covariance was assumed to comprise a single rank-one update, corresponding to the covariance matrix correction term $\Delta_1$. As was discussed earlier, the updating of the covariance matrix may be made more precise by incorporating additional terms into the correction term. A second correction term $\Delta_2$, similar to $\Delta_1$ but including an additional term $\gamma^{(1)}D$, was defined in Equation (4). Updates corresponding to $\Delta_2$ may be performed in the root domain by performing a sequence of rank-one updates, as shown below.

First, a column vector $e_k^{(1)}$ is defined, having the value $\sqrt{d_k^{(1)}}$ from Equation (5) in the k-th position, and zero otherwise. Then:

$$D = \sum_k e_k^{(1)} e_k^{(1)H}. \quad (23)$$

It follows that D can be accounted for in the root matrix update by using a sequence of q rank one updates using the RU(•) function, where q is the number of channel taps. (Those skilled in the art will appreciate that the instances where $d_k^{(1)} = 0$ may be skipped.) The preceding approach applies to any stage i. Thus in total, it would take at most q+1 RU(•) updates to account for $\Delta_2$ in a given stage.

In general, further terms beyond $\Delta_2$ may be broken into rank-one updates and processed accordingly. However, it is also possible to apply root matrix updates corresponding to covariance updates having rank higher than one. In the mathematical literature, such as M. Seeger, "Low rank updates for the Cholesky decomposition," Department of EECS, UC Berkeley, 2005, corresponding matrix root updates for matrix updates having ranks higher than one have been derived. Thus, higher rank updates of the square-root covariance matrix may be employed in embodiments of the present invention as well. However, it is important to keep in mind that in order for the higher order rank update to be attractive from a complexity perspective, the rank of the update should be small relative to the size of the matrix, as in 5-10% of the size.

As mentioned earlier, in some embodiments of the invention, a single covariance matrix may be computed for the composite communication signal, with the matrix including elements for all delays used in the receiver. A given stage may actually use fewer than all of the delays represented in the covariance matrix or the corresponding square-root covariance matrix. Thus, a receiver stage 220-$i$ may have as an input a covariance matrix $R_d^{i-1}$ computed for a regular grid of $N_d$ delays. These delays are part of an overall set D of delays. The signal detection circuit 230-$i$ of may either use all delays in set D, or select a subset of $N_s$ delays from set D, with $N_s < N_d$.

When an individual receiver stage 220 uses a subset of all delays, the root covariance matrix used for weight computation can be computed by at least two approaches. In the first approach, the covariance matrix is computed from the root matrix, and then the rows and columns of the resulting covariance matrix corresponding to the unused fingers (delays) are eliminated. Then either the resulting covariance matrix is used directly for signal detection operations, or the root matrix of the resulting covariance matrix is then computed, and used for signal detection operations. In a second approach, the square-root covariance matrix may be updated directly, by computing a rank-one update of the root matrix for each of the eliminated delays. The details of such a rank-one update are provided in U.S. Patent Application Publication 2008/0063033, which was incorporated by reference above.

In each receiver, selection of fingers may be based on the information from the searcher, and only the delays selected by the searcher and included in set D are used for combining. In general the resolution of the searcher of each receiver can be different from the resolution of the delays in set D. In such embodiments, if a delay given by the searcher is not part of the set D, then the closest delay in set D may be selected. Selection of a subset of fingers may also be done based on the G-Rake weights, e.g., by selecting a subset of fingers having the largest magnitude weights. (See, for example, G. E. Bottomley, T. Ottosson, and Y.-P. E. Wang, "A generalized Rake receiver for DS-CDMA systems," in Proc. of IEEE Veh. Technol. Conf. 2000, pp. 941-945.) In these embodiments, the weights may be computed for all fingers in set D (using $M^{(i-1)}$), but only a subset of the weights is used for combining.

In another embodiment, an individual receiver may include additional delays not present in D. This is the case, for instance, when the individual receiver has a higher resolution than that of D. The individual receiver may augment the root covariance matrix to include the extra delays, using the channel estimate at the new delay locations. The augmentation may be performed by applying a sequence of rank-one update of the root matrix. The augmented matrix is then used in the demodulation of the signal of interest.

In the update block, the individual receiver may revert to the original un-augmented root covariance matrix, and remove the effect of its signal from it. Alternatively, the individual receiver may use the augmented root covariance matrix, and remove the effect of its signal from it. This may be done to help subsequent individual receivers.

Figure 7A:
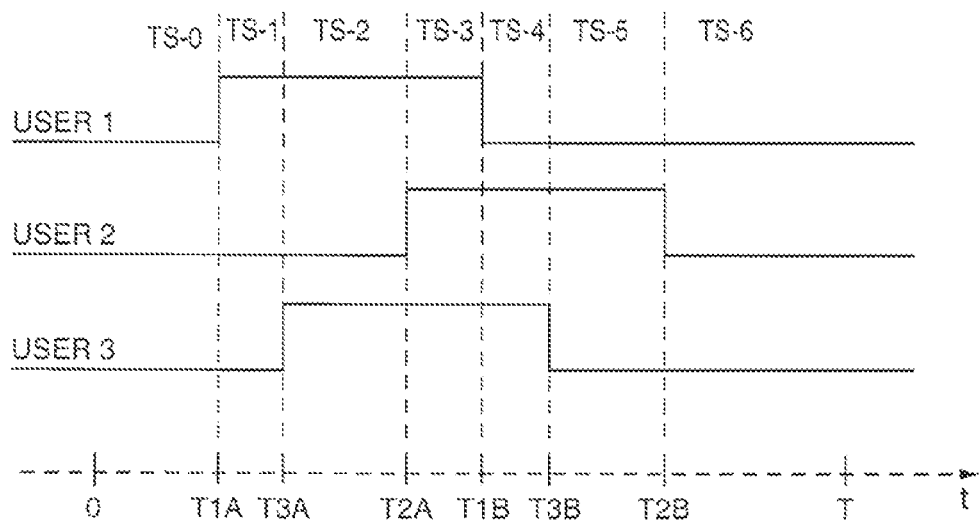
FIG. 7 illustrates the timing of several misaligned received signals.

Finally, consider the situation in which we have non-synchronized transmissions, shown schematically in FIG. 7A. Three user signals arrive at times T1A, T2A and T3A, and end at times T1B, T2B and T3B. In FIG. 7A, the Transmission Time Intervals (TTIs) are the same, although in general they might differ. The misalignment of transmissions results in different interference conditions over time, as indicated by the numbered time-spans (TS-0 through TS-6) in the figure.

The receiver stages discussed above may be modified to account for misaligned user signals. Referring once more to FIG. 7A, assume that the user signals are processed in the order pictured. In general, of course, the user signals may be processed in any order; there is no necessary connection between the order of arrival and the processing of the users. In one embodiment of the invention, a receiver stage 220 stores a window (0,T) of received signal data that covers the full transmissions for all three of the user signals. In FIG. 7A, the illustrated window has been selected to be considerably longer than a single user's transmission time. In general, a longer processing window enables the receiver to handle the effects of more users. If the window is centered around a particular user, e.g., User 1, then a window size of three times the (common) transmission duration will account for all users that may overlap with User 1.

The above discussions of various receiver stages implicitly assumed that the square-root covariance matrix remained constant over the receiver window. Referring to FIG. 4, for example, receiver stage 220"-$i$ accepts a single root matrix $M^{(i-1)}$, and produces a single update matrix $M^{(i)}$. However, these receiver stages may be modified to accept a sequence of root matrices and to produce a sequence of matrices, reflecting the change in interference conditions over the duration of the window. For instance, the processing window may be viewed as including a predetermined number Q of discrete time points. The time values T1A to T3B may be quantized accordingly. For the sake of clarity, in the discussion that follows a sequence of matrices is denoted as $\overline{M^{(i-1)}}$, where the k-th matrix in the sequence is $M^{(i-1)}(k)$, for $\overline{k}=1 \ldots Q$. Thus, as modified, receiver stage 220"-$i$ accepts a sequence $\overline{M^{(i-1)}}$, and produces the sequence $\overline{M^{(i)}}$. Efficient ways of storing or computing these matrix sequences will be discussed further below.

Figure 7B:
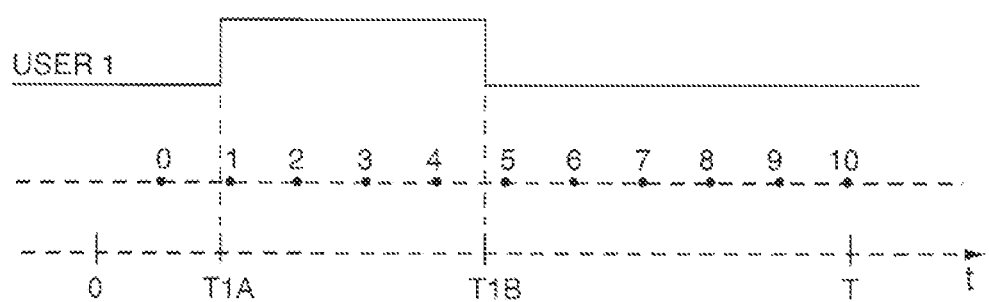

In FIG. 7B the time interval (0,T) is quantized to Q=10 discrete time values, indicated as 1 ... 10. Also in this example, T1A is closest to 1 and T1B is closest to 5, indicating that User 1 is present for values 1 to 5, and absent otherwise. Referring once again to FIG. 7A, a receiver stage may be configured to handle User 1 first. The initial root matrix sequence $\overline{M^{(0)}}$ (or its corresponding covariance matrix sequence $\overline{R_d^{(0)}}$) is assumed to be constant over the window at the input to receiver stage 220"-1 (see FIG. 5). User 1 is "on" during the interval (T1A,T1B). At the output of receiver stage 220"-1, the updated root matrix takes the following values:
over (0,T1A): no change, $M^{(1)}(k)=M^{(0)}(k)$;
over (T1A,T1B), new value $M^{(1)}(k)$;
over (T1B,T), no change, $M^{(1)}(k)=M^{(0)}(k)$.
Note that the new value $M^{(1)}(k)$ for the intermediate interval may be calculated using the rank-one update techniques discussed above with respect to Equation (17).

Receiver stage 220"-2 accepts the sequence $\overline{M^{(1)}}$ computed by receiver stage 220"-1. It uses the new sequence of square-root covariance matrices for the demodulation of User 2, and updates it for receiver stage 220"-3. Over the interval (T2A, T2B), there are two different values of $M^{(1)}(k)$ used to demodulate User 2's signal.

In general, if an interval (TxA,TxB) contains Q' discrete time values, then there may be as many as Q' different values of $M^{(1)}(k)$. There are several approaches for handling this situation. First, Q' distinct G-Rake solutions may be computed in some embodiments. In other embodiments, the Q' values of $M^{(1)}(k)$ may be averaged, and a single G-Rake solution computed from the result. In yet other embodiments, the covariance matrices corresponding to the Q' values of $M^{(1)}(k)$ may be averaged, with the result used to compute a single G-Rake solution.

Continuing with the processing of the three user signals of FIG. 7A, receiver stage 220"-2 also updates the sequence $M^{(1)}(k)$ for the Q' values over the interval (T2A,T2B):
over (0,T2A): no change;
over (T2A,T2B), new value $M^{(2)}(k)$;
over (T2B,T), no change, $M^{(2)}(k)=M^{(1)}(k)$.
Again, updated values for any of the square-root covariance matrices in the sequence may be computed using the rank-one update techniques discussed herein. Finally, receiver stage-220"-3 accepts the sequence $\overline{M^{(2)}}$, and applies it in the same manner. Those skilled in the art will appreciate that these techniques may be applied in any number of stages, and will also appreciate that time-varying sequences of square-root covariance matrices may be computed to account for time-varying arrivals of some or all of the user signals processed in the receiver.

Because the same scenario, in terms of which signals are present, is repeated over different sub-intervals of the receiver processing window, any of several techniques may be employed to more efficiently compute and/or store the Q values of the sequence $\overline{M^{(i)}}$. In some embodiments, for example, only distinct values of the root matrix are computed and tracked. Referring again to the example in FIG. 1, the first receiver stage (processing User 1) may recognize that there are only two distinct values for $M^{(1)}(k)$. The first receiver stage may store only those two values, rather than all Q values. It also stores the indices corresponding to these two values, and feeds the two matrices and the indices forward to the next receiver stage. The second receiver stage recognizes that there are two distinct values of $M^{(1)}(k)$ among the Q' values in the interval (T2A,T2B); this may be exploited to simplify the various approaches discussed above for the demodulation of signal two. For instance, if separate G-Rake solutions are computed for distinct time intervals, then only two G-Rake need be computed, instead of Q'. If averaging approaches are instead used, then the averaging operation may be simplified to a weighted average of two values. In any event, when the second receiver stage computes the updated sequence $\overline{M^{(2)}}$, it indicates that there is a first value over the intervals (0,T1A) and (T2B,T), a second value over (T1A, T2A), a third value over (T2A,T1B), and a fourth over (T1B, T2B).

To summarize this first approach, receiver stage i accepts a set of distinct values for $M^{(i-1)}(k)$, and their indices. It exploits this information in its own demodulation, and it updates this information to produce a set of distinct values for $M^{(i)}(k)$, and their indices. This information is passed along to the next receiver stage i+1.

A second approach takes this direction further, by recognizing which signals are present in which sub-intervals. That is, the first receiver stage indicates that User 1 is present over (T1A,T1B), and absent over (0,T1A) and (T1B,T). Next, the second receiver stage indicates that User 2 is present over (T2A, T2B), and absent over (0,T2A) and (T2B,T). Furthermore, it can merge this with the previous information, to indicate that signal 1 is present over (T1A,T2A), Users 1 and 2 are present over (T2A,T1B), User 2 is present over (T1B, T2B), and none are present over (0,T1A) and (T2B,T). Note that in keeping with the sequential flow of information, for this second approach each module only knows the information it is fed and the information it produces. Neither the first nor second receiver stage incorporates knowledge about User 3, in this example.

The computation of the root matrix values can now be done according to this signal information. That is, the updates are carried according to which signals are present. This opens the possibility of storing intermediate values that may be useful in different sub-intervals. For instance, say some signals 1,2, 3,4 are present in one sub-interval, and signals 1,2,3,5 are present in another interval. Then for receiver stage 5, which is aware of all five signals, it may be useful to store the intermediate value reflecting signals 1,2,3. This intermediate value can be used to complete the computation of the root matrix update for 1,2,3,4 and for 1,2,3,5.

To summarize this second approach, receiver stage i accepts information about the presence of different signals, in addition to a set of distinct values for $M^{(i-1)}(k)$. It exploits this information in its own demodulation, by computing intermediate values that can be reused in different sub-intervals. It also updates this information about the presence of different signals, as well as a set of distinct values for $M^{(i)}(k)$.

A third approach extends the second approach, by avoiding the sequential restriction on information discussed above. Specifically, in some embodiments a receiver stage i may be provided with information regarding the presence of signals that will be handled later. This enables it to compute intermediate values, knowing that these will be reused in a later module as opposed to the current module itself. Consider the same example as above, where signals 1,2,3,4 are present in one sub-interval, and signals 1,2,3,5 are present in another sub-interval. Receiver stage 4 is concerned with signals 1,2, 3,4. In addition, it is provided with an indication that signals 1,2,3,5 will be present in a sub-interval that will be of interest to receiver stage 5, in subsequent processing. So, receiver stage 4 may compute and store an intermediate value reflecting signals 1,2,3, and forward it to receiver stage 5, for later use.

To summarize the third approach, a receiver stage i accepts information about the presence of different signals, including signals to be handled later, in addition to a set of distinct values for $M^{(i-1)}(k)$, which may include intermediate values that it or subsequent modules can use. It exploits this information in its own demodulation, by computing intermediate values that can be reused in different sub-intervals. It also computes intermediate values that are of use in subsequent modules. It updates the information about the presence of different signals if needed, as well as a set of distinct values for $M^{(i)}(k)$, and intermediate values that subsequent modules can use.

As described above, the update of the covariance matrix in each block has the effect of removing the contribution of the cancelled signal and providing an estimate of the remaining interference. So far, various embodiments of the invention have been described assuming that every module processes and updates the input data covariance matrix. However, those skilled in the art will appreciate that one or more receiver stages in a successive interference subtraction receiver may re-estimate the covariance of the updated communication signal after subtraction of the detected signal. In such embodiments, the corresponding root matrix is then computed according to Equation (8). In such an embodiment, this particular receiver stage would not update the square-root covariance matrix using the techniques described above. Such a configuration might be desirable when an accurate estimate of $R^{(i+1)}$ from the signal after cancellation is readily available. Alternatively, such a configuration might be useful to correct for any accumulated errors that might creep in to the updated covariance data after several updates.

Figure 8:
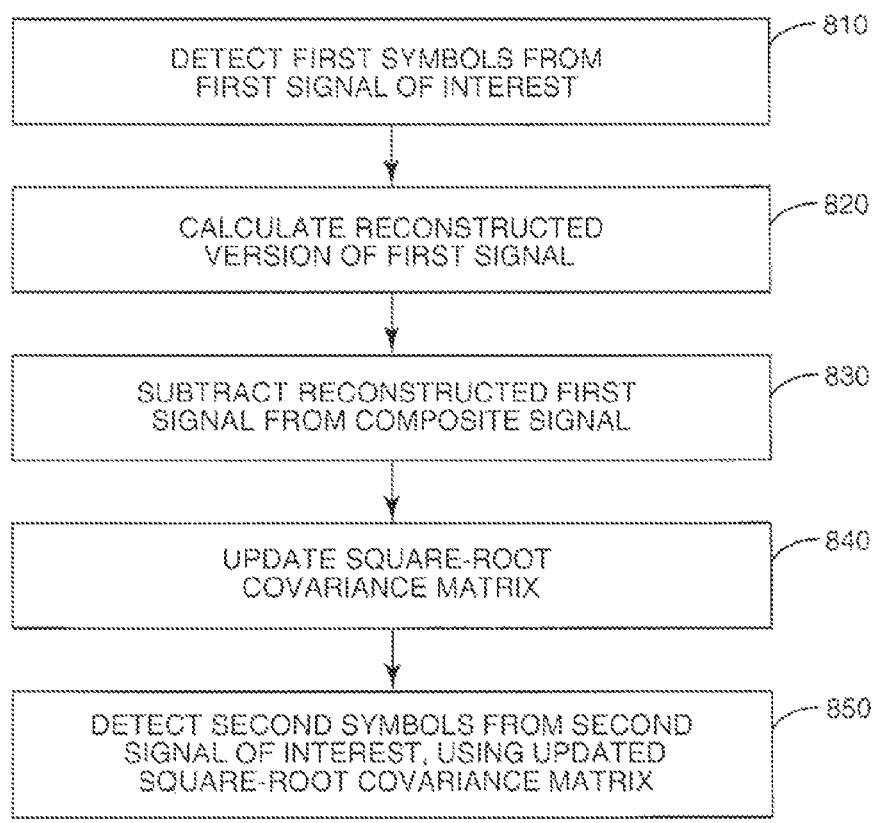
FIG. 8 is a logic flow diagram illustrating an exemplary method for processing a composite communication signal.

With the above receiver structures in mind, a general method for processing a composite communication signal comprising two or more simultaneously received (i.e., overlapping) signals of interest is illustrated in FIG. 8. This method may be carried out at one or more of the receiver stages 220 discussed above. The illustrated method begins at block 810, with the detection of first symbols from a first signal of interest in the composite communication signal. This detection may be carried out using one of the signal detection circuits 230 discussed above and may, in various embodiments, use processing weights calculated from a square-root covariance matrix and net channel response information corresponding to the first signal of interest. As discussed at length above, the square-root covariance matrix may correspond to a data covariance matrix for the composite communication signal. In some embodiments, the square-root covariance matrix may instead correspond to an impairment covariance matrix; those skilled in the art will appreciate the close relationship between data covariance and impairment covariance and the slight differences in processing corresponding to each. Those skilled in the art will also appreciate that the signal detection of block 810 may be performed using a G-Rake receiver, in which case the processing weights correspond to combining weights applied to the G-Rake de-spread outputs, or a chip equalizer, in which case the processing weights are chip equalizer weights applied to the chip equalizer taps.

In any event, the symbols detected at block 810 are used at block 820 to calculate a reconstructed version of the first signal of interest. In some embodiments, the reconstruction of the first signal of interest comprises calculating a re-spread signal, using the detected symbols, the appropriate spreading code (which may comprise a combination of a channelization code and a scrambling code), and an estimated net channel response for the first signal of interest.

Alternatively, soft information from the demodulator or the decoder can be used in the signal reconstruction and subtraction. That is, soft information about the modern bits may be obtained from the demodulator or the decoder. Typically, the soft information is in the form of log-likelihood ratio (LLR) or an approximation thereof. Those LLR's can be transformed into modern bit probabilities, which in turn can be transformed into symbol probabilities. The expected value of the symbol can be computed from the symbol values and the symbol probabilities. This expected value is used as the "soft symbol". The soft symbol is multiplied by the spreading sequence to produce a "soft signal" to be used in the subtraction step.

At block 830, the reconstructed first signal is subtracted from the composite communication signal to obtain an updated communication signal for subsequent processing. Interference caused by the detected first signal to later-detected signals should thus largely be absent from the updated communication signal. This change in the overall impairment present in the updated communication signal is accounted for by updating the square-root covariance matrix, as shown at block 840, to obtain an updated square-root covariance matrix. In some embodiments, as described above, this updating may comprise a rank-one update to the square-root covariance matrix, calculated as a function of the net channel response for the first signal. In others, the updating may include two or more rank-one updates, to reflect a more accurate correction to the covariance data. These updates may be based on a model for the data covariance of the reconstructed signal of interest, where the model may comprise several rank-one update terms. In some cases, such a model may include a diagonal matrix, where the diagonal elements are calculated from the net channel response for the first signal of interest, in which case the square-root covariance matrix may be updated by applying a series of rank-one updates, each rank-one update corresponding to one of the diagonal elements. In still other embodiments, the updating process may include an update to the square-root covariance matrix with a rank higher than one.

In any case, the updated square-root covariance matrix is passed to a subsequent receiving stage. The next stage uses the updated square-root covariance matrix, as shown at block 850, to detect second symbols, corresponding to a second signal of interest, from the updated communication signal. The signal detection processing of the next stage thus reflects an impairment model that more accurately characterizes the impairments in the updated communication signal, so that interference suppression capability is not wasted on an interfering signal (the first signal of interest) that has been removed (at least substantially) from the composite communication signal. Processing weights calculated from the updated square-root covariance matrix for use in detecting the second signal of interest thus reflect this improved impairment characterization.

Figure 9:
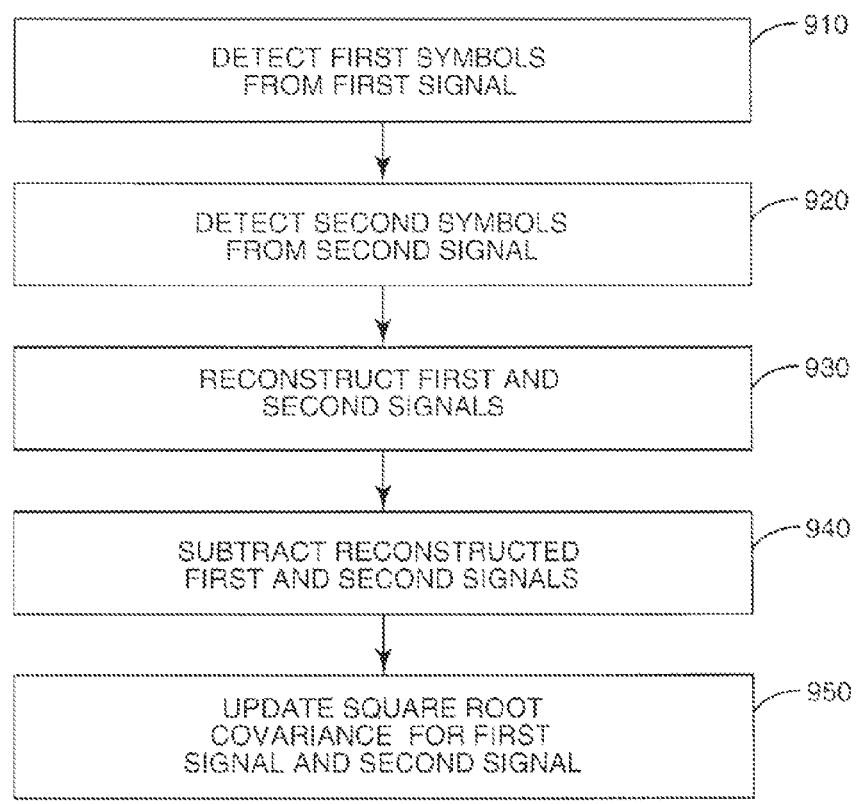
FIG. 9 is another logic flow diagram illustrating a method for processing communication signals according to the invention.

In some embodiments, as discussed above, two or more signals may be detected in parallel, using the same square-root covariance matrix. This is illustrated in FIG. 9. At block 910, symbols from a first signal of interest are detected from a composite communication signal. At block 920, symbols from a second signal of interest are detected from the same composite communication signal. These detection processes may be performed simultaneously, in some embodiments. In any event, these detection processes use a common square-root matrix for the data covariance or impairment covariance. At block 930, the first and second signals of interest are reconstructed, using the same techniques described above. These reconstructed signals are subtracted from the composite communication signal at 940.

At block 950, the square-root covariance matrix is updated to account for the removal of the first and second signals of interest from the composite communication signal. As discussed earlier, this may be done, in some embodiments, by applying two separate rank-one updates to the square-root covariance matrix, corresponding to each of the two signals of interest. However, the updating of the square-root covariance matrix may comprise additional rank-one updates, or a higher-rank update, for either or both of the signals of interest.

Figure 10:
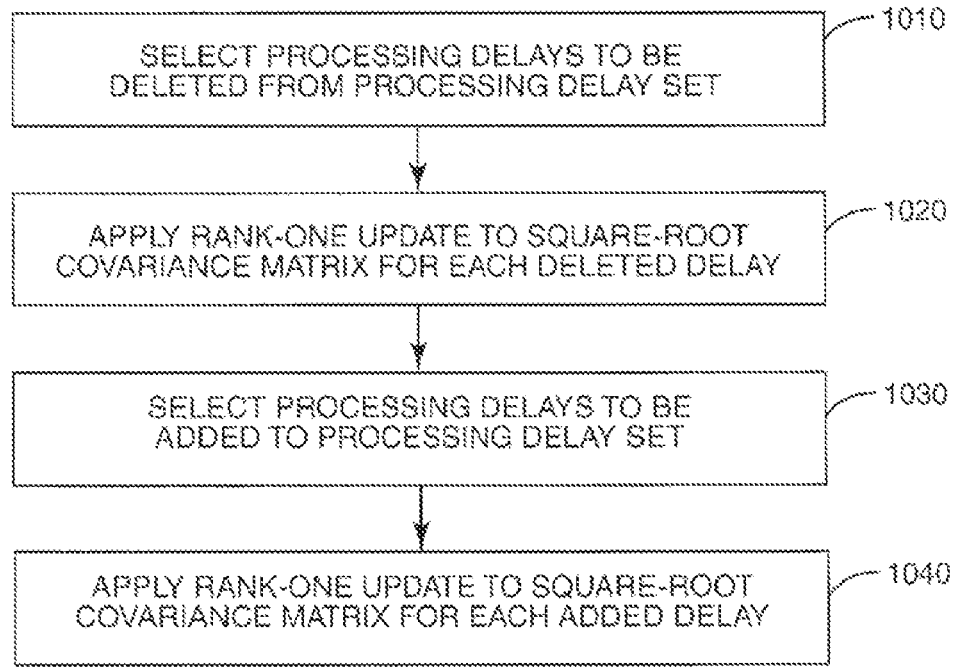
FIG. 10 is a logic flow diagram illustrating another exemplary method according to the invention.

FIG. 10 illustrates an exemplary method for adjusting the square-root covariance matrix for a given receiver stage to account for the addition and deletion of processing delays from a processing delay set. At block 1010, processing delays to be deleted from the current processing delay set are selected. At block 1020, a rank-one update is applied to the square-root covariance matrix for each of the deleted delays. At block 1030, one or more processing delays to be added to the current processing delay set are selected. Finally, at block 1040, a rank-one update is applied to the square-root covariance matrix for each added delay. Additional details regarding the augmentation or pruning of a square-root covariance matrix are provided in U.S. Patent Application Publication 2008/0063033 A1, the contents of which were previously incorporated by reference.

Figure 11:
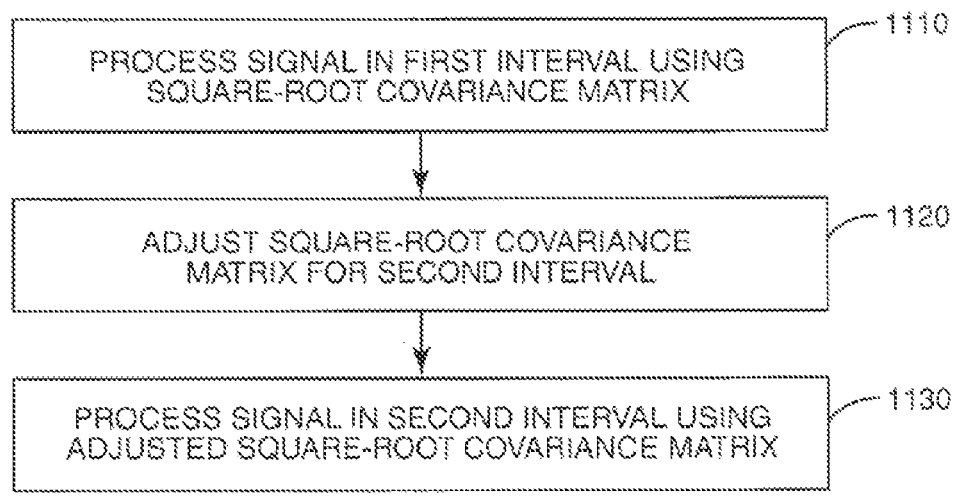
FIG. 11 is a logic flow diagram illustrating yet another exemplary method for processing communication signals according to the invention.

FIG. 11 illustrates an exemplary method for adjusting the square-root covariance matrix to account for changes in the number of received signals across time. These changes may result from misalignment of signals received from multiple transmitters. Thus, at block 1110, a communication signal is processed for a first interval of time using a first square-root covariance matrix. At block 1120, the square-root covariance matrix is adjusted for a second interval of time to reflect the addition or departure of an interfering signal. As was described earlier, this may be done with a rank-one update based on the net channel response for the newly-arrived or newly-departed signal, although more complex updates may also be applied. At block 1130, the adjusted square-root covariance matrix is used to process the composite communication signal during a second interval. Those skilled in the art will appreciate that the slot-misalignment adjustment illustrated here may be used in a single receiver stage or in each of several receiver stages, in combination with the square-root covariance updating processes described earlier.

The above-described methods and receiver circuits, and variants thereof, may be embodied in any of a number of wireless devices, such as a base station or mobile terminal. In fact, the techniques and apparatus described herein may generally be adapted to any signal processing devices that utilizes interference covariance matrices and successive signal subtraction techniques. Those skilled in the art will appreciate that the various circuits discussed herein, such as the signal detection circuits 230 and update processing circuits 240, may be implemented using one or more microprocessors, microcontrollers, digital signal processors, and/or customized hardware, and may be implemented as a standalone chip or as part of an application-specific integrated circuit (ASIC) that includes other functions. The functions of one or more of the circuits described herein may be performed using two or more processing elements, in some embodiments, while the functions of two or more circuits may be performed using a single processing element in others. These signal processing circuits may comprise one or more programmable elements, programmed using software, firmware, or some combination of the two. The signal processing circuits may also include one or more elements that are hardwired to carry out one or more of the methods described herein.

The present invention may be carried out in other ways than those specifically set forth herein without departing from essential characteristics of the invention. The present embodiments are to be considered in all respects as illustrative and not restrictive, and all changes coming with the meaning and equivalency range of the appended claims are intended to be embraced within.

What is claimed is:

1. A method for processing a composite communication signal comprising two or more simultaneously received signals of interest, the method comprising:
  detecting first symbols, corresponding to a first signal of interest, from the composite communication signal, using first processing weights calculated from a square-root covariance matrix and a net channel response for the first signal of interest, wherein the square-root covariance matrix represents impairment covariance or data covariance for the composite communication signal;
  calculating a reconstructed version of the first signal of interest, based on the detected first symbols;

generating an updated communication signal by subtracting the reconstructed version of the first signal of interest from the composite communication signal; and updating the square-root covariance matrix to obtain an updated square-root covariance matrix corresponding to the updated communication signal.

2. The method of claim 1, wherein updating the square-root covariance matrix comprises applying one or more rank-one updates to the square-root covariance matrix.

3. The method of claim 2, wherein the one or more rank-one updates to the square-root covariance comprise a first rank-one update calculated as a function of the net channel response for the first signal of interest.

4. The method of claim 1, wherein updating the square-root covariance matrix comprises updating the square-root covariance matrix based on a model of the data covariance of the reconstructed version of the first signal of interest.

5. The method of claim 4, wherein the model comprises a first term based on the outer product of the net channel response for the first signal of interest and a second term comprising a diagonal matrix with diagonal elements calculated from the net channel response for the first signal of interest, and wherein updating the square-root covariance matrix comprises applying a series of rank-one updates, each rank-one update corresponding to one of the diagonal elements.

6. The method of claim 4, wherein updating the square-root covariance matrix comprises applying at least one update having a rank higher than one to the square-root covariance matrix.

7. The method of claim 1, further comprising detecting second symbols, corresponding to a second signal of interest, from the updated communication signal, using second processing weights calculated from the updated square-root covariance matrix and a net channel response for the second signal of interest.

8. The method of claim 7, further comprising:
calculating a reconstructed version of the second signal of interest, based on the detected second symbols;
generating a second updated communication signal by subtracting the reconstructed version of the second signal of interest from the updated communication signal; and
calculating an estimated data covariance matrix based on the second updated communication signal.

9. The method of claim 1, further comprising:
detecting second symbols corresponding to a second signal of interest in the composite communication signal, using second processing weights calculated from the square-root covariance matrix and a net channel response for the second signal of interest; and
calculating a reconstructed version of the second signal of interest, based on the detected second symbols;
wherein generating the updated communication signal further comprises subtracting the reconstructed version of the second signal of interest from the composite communication signal, and wherein updating the square-root covariance matrix comprises applying a first update corresponding to the first signal of interest and a second update corresponding to the second signal of interest.

10. The method of claim 1, wherein the square-root covariance matrix corresponds to a set of processing delays, and wherein detecting first symbols comprises:
selecting one or more processing delays to be deleted from the set before calculating the processing weights;
applying a rank-one update to the square-root covariance matrix for each of the deleted processing delays to obtain a modified square-root covariance matrix; and calculating the first processing weights as a function of the modified square-root covariance matrix and the net channel response for the first signal of interest.

11. The method of claim 1, wherein the square-root covariance matrix corresponds to a set of processing delays, and wherein detecting first symbols comprises:
selecting one or more processing delays to be added to the set before calculating the processing weights;
applying a rank-one update to the square-root covariance matrix for each of the deleted processing delays to obtain a modified square-root covariance matrix; and
calculating the first processing weights as a function of the modified square-root covariance matrix and the net channel response for the first signal of interest.

12. The method of claim 1, wherein the first symbols correspond to a first interval of time, further comprising:
adjusting the square-root covariance matrix for a second interval of time by applying a rank-one update to the square-root covariance for a second signal present in the composite communication signal during the first interval but not present during the second interval;
detecting second symbols during the second interval using the adjusted square-root covariance matrix.

13. The method of claim 1, wherein updating the square-root covariance matrix comprises calculating a first updated square-root covariance matrix and a second updated square-root covariance matrix, corresponding to first and second intervals of time, based on the presence or absence of one or more of the signals of interest during each of the first and second intervals of time.

14. The method of claim 13, further comprising detecting second symbols, corresponding to a second signal of interest, from the updated communication signal, using second processing weights, calculated from the first updated square-root covariance matrix, during the first interval of time, and using third processing weights, calculated from the second updated square-root covariance matrix, during the second interval of time.

15. The method of claim 13, further comprising detecting second symbols, corresponding to a second signal of interest, from the updated communication signal, using second processing weights, calculated as a function of the first and second updated square-root covariance matrices, during the first and second intervals of time.

16. A receiver circuit for receiving a composite communication signal comprising two or more signals of interest, the receiver circuit comprising:
a signal detection circuit configured to detect first symbols, corresponding to a first signal of interest, from the composite communication signal, using first processing weights calculated from a square-root covariance matrix and a net channel response for the first signal of interest, wherein the square-root covariance matrix represents impairment covariance or data covariance matrix for the composite communication signal;
an interference cancellation circuit configured to calculate a reconstructed version of the first signal of interest, based on the detected first symbols, and to generate an updated communication signal by subtracting the reconstructed version of the first signal of interest from the composite communication signal; and
a covariance update circuit configured to update the square-root covariance matrix to obtain at least a first updated square-root covariance matrix corresponding to the updated communication signal.

17. The receiver circuit of claim 16, wherein the covariance update circuit is configured to update the square-root covariance matrix by applying one or more rank-one updates to the square-root covariance matrix.

18. The receiver circuit of claim 17, wherein the covariance update circuit is configured to calculate a first one of the one or more rank-one updates to the square-root covariance as a function of the net channel response for the first signal of interest.

19. The receiver circuit of claim 16, wherein the covariance update circuit is configured to update the square-root covariance matrix based on a model of the data covariance of the reconstructed version of the first signal of interest.

20. The receiver circuit of claim 19, wherein the model comprises a first term based on the outer product of the net channel response for the first signal of interest and a second term comprising a diagonal matrix with diagonal elements calculated from the net channel response for the first signal of interest, and wherein the covariance update circuit is configured to update the square-root covariance matrix by applying a series of rank-one updates, each rank-one update corresponding to one of the diagonal elements.

21. The receiver circuit of claim 16, wherein the signal detection circuit is further configured to detect second symbols, corresponding to a second signal of interest, from the updated communication signal, using second processing weights calculated from the first updated square-root covariance matrix and a net channel response for the second signal of interest.

22. The receiver circuit of claim 21, wherein the interference cancellation circuit is further configured to calculate a reconstructed version of the second signal of interest, based on the detected second symbols, and to generate a second updated communication signal by subtracting the reconstructed version of the second signal of interest from the updated communication signal, and wherein the covariance update circuit is configured to calculate an estimated data covariance matrix based on the second updated communication signal.

23. The receiver circuit of claim 16, wherein the signal detection circuit is further configured to detect second symbols corresponding to a second signal of interest in the composite communication signal, using second processing weights calculated from the square-root covariance matrix and a net channel response for the second signal of interest; wherein the interference cancellation circuit is further configured to calculate a reconstructed version of the second signal of interest, based on the detected second symbols, and to generate the updated communication signal by subtracting the reconstructed version of the second signal of interest from the composite communication signal; and wherein the covariance update circuit is configured to update the square-root covariance matrix by applying a first update corresponding to the first signal of interest and a second update corresponding to the second signal of interest.

24. The receiver circuit of claim 16, wherein the square-root covariance matrix corresponds to a set of processing delays, and wherein the signal detection circuit is configured to:
select one or more processing delays to be deleted from the set before calculating the processing weights;
apply a rank-one update to the square-root covariance matrix for each of the deleted processing delays to obtain a modified square-root covariance matrix; and
calculate the first processing weights as a function of the modified square-root covariance matrix and the net channel response for the first signal of interest.

25. The receiver circuit of claim 16, wherein the square-root covariance matrix corresponds to a set of processing delays, and wherein the signal detection circuit is configured to:
select one or more processing delays to be added to the set before calculating the processing weights;
apply a rank-one update to the square-root covariance matrix for each of the deleted processing delays to obtain a modified square-root covariance matrix; and
calculate the first processing weights as a function of the modified square-root covariance matrix and the net channel response for the first signal of interest.

26. The receiver circuit of claim 16, wherein the first symbols correspond to a first interval of time, and wherein the signal detection circuit is further configured to:
adjust the square-root covariance matrix for a second interval of time by applying a rank-one update to the square-root covariance for a second signal present in the composite communication signal during the first interval but not present during the second interval; and
detect second symbols during the second interval using the adjusted square-root covariance matrix.

27. The receiver circuit of claim 16, wherein the covariance update circuit is configured to calculate a first updated square-root covariance matrix and a second updated square-root covariance matrix, corresponding to first and second intervals of time, based on the presence or absence of one or more of the signals of interest during each of the first and second intervals of time.

28. The receiver circuit of claim 27, wherein the signal detection circuit is further configured to detect second symbols, corresponding to a second signal of interest, from the updated communication signal, using second processing weights, calculated from the first updated square-root covariance matrix, during the first interval of time, and using third processing weights, calculated from the second updated square-root covariance matrix, during the second interval of time.

29. The receiver circuit of claim 27, wherein the signal detection circuit is further configured to detect second symbols, corresponding to a second signal of interest, from the updated communication signal, using second processing weights, calculated as a function of the first and second updated square-root covariance matrices, during the first and second intervals of time.

30. The receiver circuit of claim 16, wherein the signal detection circuit comprises a G-Rake receiver and wherein the first processing weights comprise G-Rake combining weights calculated as a function of the square-root covariance matrix and the net channel response for the first signal of interest.

31. The receiver circuit of claim 16, wherein the signal detection circuit comprises a chip equalizer and wherein the first processing weights comprise chip equalizer tap weights.

* * * * *

UNITED STATES PATENT AND TRADEMARK OFFICE
CERTIFICATE OF CORRECTION

PATENT NO. : 7,929,593 B2  
APPLICATION NO. : 12/103145  
DATED : April 19, 2011  
INVENTOR(S) : Khayrallah et al.

Page 1 of 1

It is certified that error appears in the above-identified patent and that said Letters Patent is hereby corrected as shown below:

IN THE SPECIFICATIONS:

In Column 7, Line 16, delete "A" and insert -- $\Delta$ --, therefor.

In Column 7, Line 30, after Equation "(2)", insert -- . --.

In Column 7, Line 39, after Equation "(3)", insert -- . --.

In Column 7, Line 44, after Equation "(4)", insert -- . --.

In Column 7, Line 61, delete "A" and insert -- $\Delta$ --, therefor.

In Column 7, Line 67, delete "$k_1$, k" and insert -- $k_1$, $k_1$ --, therefor.

In Column 8, Line 28, after Equation "(6)", insert -- , --.

In Column 8, Line 39, after Equation "(7)", insert -- . --.

In Column 9, Line 64, after Equation "(17)", insert -- . --.

In Column 10, Line 59, after Equation "(19)", insert -- . --.

In Column 12, Line 25, delete "$R_d^{i-1)}$" and insert -- $R_d^{(i-1)}$ --, therefor.

In Column 16, Line 48, delete "modern" and insert -- modem --, therefor.

In Column 16, Line 52, delete "modern" and insert -- modem --, therefor.

Signed and Sealed this  
Twenty-sixth Day of February, 2013

Teresa Stanek Rea  
*Acting Director of the United States Patent and Trademark Office*